United States Patent [19]

Drake

[11] Patent Number: 5,303,662

[45] Date of Patent: * Apr. 19, 1994

[54] MINIMUM TILLAGE TOOL BAR AND METHOD FOR USING SAME

[76] Inventor: Denny Drake, R.R. 4, Box 164, Davenport, Iowa 52804

[ * ] Notice: The portion of the term of this patent subsequent to Nov. 25, 2003 has been disclaimed.

[21] Appl. No.: 660,137

[22] Filed: Feb. 21, 1991

Related U.S. Application Data

[63] Continuation of Ser. No. 537,087, Jun. 11, 1990, abandoned, which is a continuation of Ser. No. 175,609, Mar. 25, 1988, abandoned, which is a continuation of Ser. No. 918,090, Oct. 14, 1986, abandoned, which is a continuation-in-part of Ser. No. 756,100, Jul. 17, 1985, Pat. No. 4,624,197, which is a continuation of Ser. No. 443,442, Nov. 22, 1982, abandoned.

[51] Int. Cl.$^5$ ............................................. A01B 51/00
[52] U.S. Cl. .................................... 111/52; 172/60; 172/63; 172/98; 172/117; 172/776
[58] Field of Search ..................... 111/52, 6, 7, 85, 80, 111/84, 83, 73; 172/117, 245, 98, 250, 253, 254, 687, 688, 187, 689, 144–146, 151, 776, 763, 6, 149, 164, 175, 179, 180, 195, 200, 196, 184, 60, 57, 63, 70, 71, 166, 156

[56] References Cited

U.S. PATENT DOCUMENTS

| | | | |
|---|---|---|---|
| 2,546,461 | 3/1951 | Lewis | 97/47 |
| 2,556,072 | 6/1951 | Dewey | 111/200 X |
| 2,935,139 | 5/1960 | Dede | . |
| 3,061,018 | 10/1962 | Olson | 172/139 |
| 3,110,275 | 11/1963 | Bonney | 111/70 |
| 3,135,339 | 6/1964 | Fry et al. | 172/413 |
| 3,194,193 | 7/1965 | Walters | 111/6 |
| 3,202,221 | 8/1965 | Monk et al. | . |
| 3,239,015 | 3/1966 | Scott | 172/413 |
| 3,306,241 | 2/1967 | Copple | 111/7 |
| 3,398,707 | 8/1968 | McClenny | 111/85 |
| 3,437,061 | 4/1969 | Wells | 111/1 |
| 3,491,709 | 1/1970 | Fleischer et al. | 111/85 |
| 3,528,507 | 3/1970 | Morkoski | 172/413 |
| 3,592,271 | 7/1971 | Schneider | 172/175 |
| 3,779,320 | 12/1973 | Cantone | . |
| 3,811,387 | 5/1974 | Meiners | 111/1 |
| 3,951,214 | 4/1976 | Ramsower | 172/274 |
| 4,019,755 | 4/1977 | Eisenhardt | 172/679 X |
| 4,048,929 | 9/1977 | Zumbahlen | 111/85 |
| 4,055,126 | 10/1977 | Brown | 111/85 |
| 4,058,068 | 11/1977 | van der Lely | . |
| 4,088,083 | 5/1978 | Dail, Jr. et al. | 111/13 |
| 4,108,089 | 8/1978 | Van Der Lely | 111/7 |
| 4,187,916 | 2/1980 | Harden | 172/146 |
| 4,230,054 | 10/1980 | Hatcher | 111/62 |
| 4,241,674 | 12/1980 | Mellinger | 111/52 |
| 4,244,306 | 1/1981 | Peterson et al. | 111/7 |
| 4,258,635 | 3/1981 | Lutz et al. | 111/52 |
| 4,539,921 | 9/1985 | Morlock | . |
| 4,586,444 | 5/1986 | Thiesson | 111/122 |

FOREIGN PATENT DOCUMENTS 129883 10/1959 U.S.S.R. .

Primary Examiner—Danton D. DeMille
Attorney, Agent, or Firm—Zarley, McKee, Thomte, Voorhees, & Sease

[57] ABSTRACT

A minimum tillage farm implement capable of being used for plowing, cultivating, planting and insecticide and herbicide and fertilizer application, which includes a tool bar frame having three parallel spaced apart laterally positioned tool bars held together by detachable interconnecting frame members. Coulters, chisel plows and discing pairs are mounted in series to the front tool bar. Variable width rototillers are attached to the middle tool bar and planters are attached to the rear tool bar, both serially alligned with the discing pairs. The coulters, chisel plows, discs and rototillers prepare a fine seed bed, even in stalks and stubble, to allow beneficial planting of row crop seeds by the planters. In a second mode the front and rear tool bars are detached leaving only the middle tool bar with rototillers, which can be adjusted for width and position to perform as cultivators of the areas between adjacent seed beds.

18 Claims, 3 Drawing Sheets

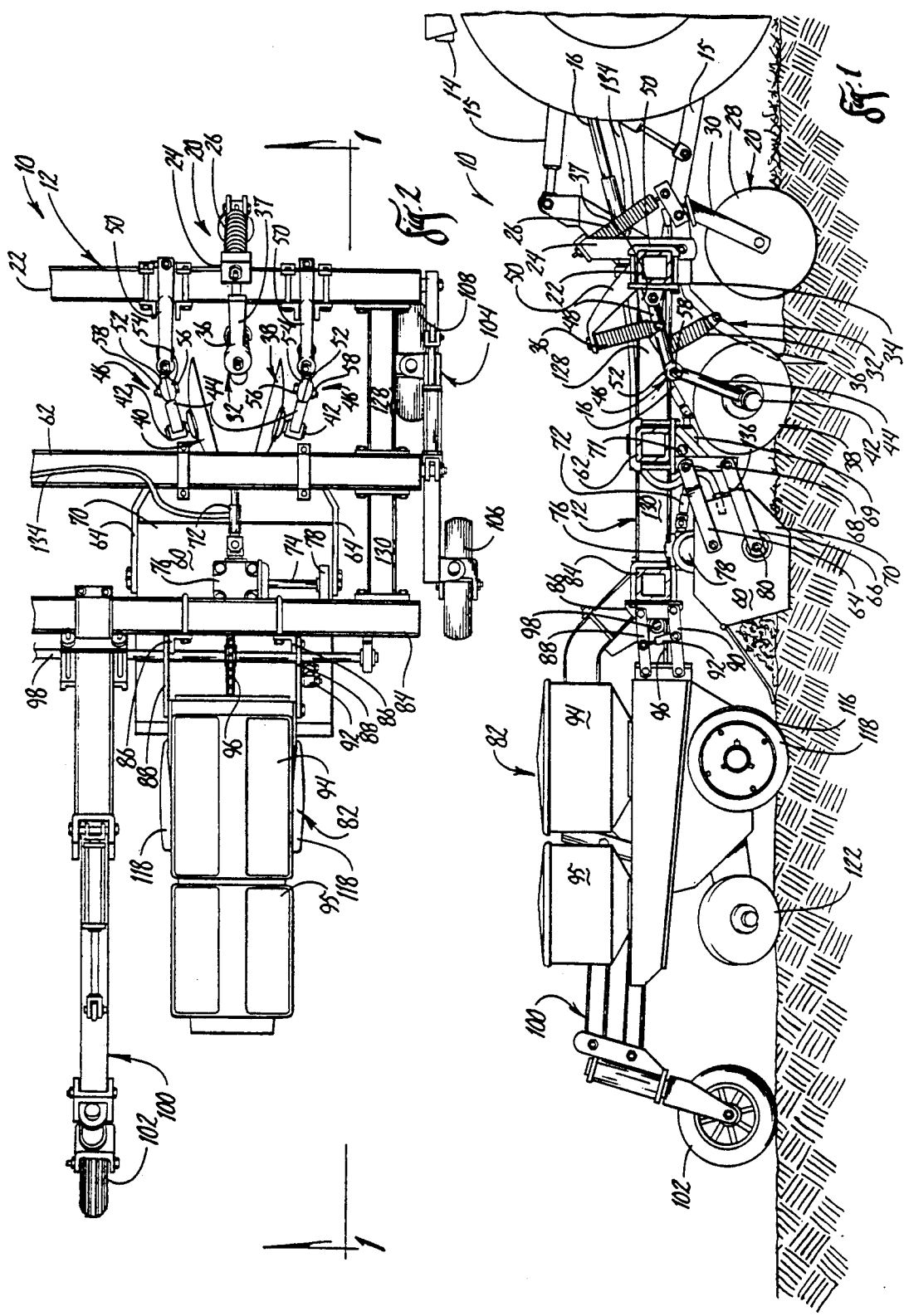

MINIMUM TILLAGE TOOL BAR AND METHOD FOR USING SAME

This is a continuation from Ser. No. 07/537,087 filed Jun. 11, 1990, now abandoned; which is a continuation from Ser. No. 07/175,609 filed Mar. 25, 1988, now abandoned; which is a continuation from Ser. No. 06/918,090 (abandoned) filed Oct. 14, 1986; which is a continuation in part from Ser. No. 06/756,100 (now U.S. Pat. No. 4,624,197) filed Jul. 17, 1985; and which is a continuation from Ser. No. 07/443,442 (abandoned) filed Nov. 22, 1982.

BACKGROUND OF THE INVENTION

This invention relates to minimum tillage farming equipment, more particularly to minimum tillage farming implements which perform multiple functions simultaneously and can be used in different modes.

In the ever continuing search to balance increased agricultural production against environmental stewardship, and to conquer the economic barriers of ever-increasing fuel, equipment and material costs, minimum tillage farming has become an attractive alternative to conventional row crop farming methods.

Traditional row crop farming is based upon multipass operations beginning with preparing the field for planting and ending with the harvesting of the crop. It is not uncommon for some farmers to make five or more passes over a given field before harvesting including conventional plowing or chisel plowing, discing, applying chemicals and fertilizers, planting and cultivating. The costs in fuel, equipment, and supplies and materials are evident; while the more intangible costs of labor, time, soil stress and soil erosion have risen to be significant concerns.

Compaction of the soil also results and has been found to reduce productivity significantly. Research has shown that something as seemingly innocent as a footprint can compact soil enough to inhibit plant growth. Compaction by the large, heavy equipment of today produces what is called "hardpan" which can cut productivity by 50% or more.

Minimum tillage methods and equipment have been in use and practiced for a number of years, but the economic and environmental pressures of recent times have prompted their adoption on a wide scale basis. As explained above, minimum tillage attempts to minimize the number of ground-working implement passes over a given field to reduce fuel, labor, equipment and environmental costs.

The difficulties with minimum tillage farming are many and diverse. Among the major problems are first, finding and developing equipment which works effectively and efficiently in the minimally tilled ground. The equipment must be specialized and strong to attack the hardened stalk and stubble filled ground. Furthermore, it is extremely difficult to produce an adequate seed bed when the ground is not worked over a number of times.

Moisture concerns and weed control are additional significant problems that are encountered in minimum tillage farming methods. Compounding this problem is the ever present obstacle of clogging of the equipment by the remnant trash in the field.

Because weed control is so important in minimum tillage farming, both chemical herbicide incorporation and positive weed control are problems which must be conquered.

Some attempts have been made to conquer these problems by utilizing specialized equipment, some being partially or wholly powered by independent engines, which prepares the soil for an additional pass by conventional planting equipment. Others have attempted to combine the soil preparation implements and planters for one pass planting. All of these attempts still do not overcome one or more of the problems mentioned above.

Additionally, present minimum tillage equipment do not provide adequate multiple-use flexibility, such as utilizing parts of the all-in-one tillage/planting implement for subsequent specialized uses such as cultivating.

It is therefore an object of the present invention to provide a minimum tillage farm implement which performs all necessary row crop operations up to harvest with savings of time and labor, fuel, equipment costs and loss of soil.

A further object of the invention is to provide a minimum tillage farm implement which both prepares a good seed bed for the planting of row crops and plants the crop in one pass of the field.

A further object of the invention is to provide a minimum tillage farm implement which utilizes conventional planting units for the planting of the row crops.

Another object of the invention is to provide a minimum tillage farming implement which provides effective and efficient incorporation of herbicides into the seed bed while sufficient moisture is present in the soil to enhance the effectiveness of the herbicide and while additionally reducing the amount of herbicide used.

A further object of this invention is to eliminate hardpan problems by placing the seeds directly behind a chisel plow.

A further object of this invention is to apply fertilizer during the field trip in which the crop is planted.

Another object of the invention is to provide a minimum tillage farm implement which can be easily converted to provide positive weed control as a power cultivator.

A further object of this invention is to provide a power cultivator which will not plug with soil or crop trash or residue, will provide positive weed control between the rows and will reduce soil erosion by leaving a mulch of trash and dead weeds and grass between the rows.

A further object of this invention is to provide a power cultivator that does not create ridges between the rows as it passes through the field.

A further object of this invention is to provide a minimum tillage farm implement which does not clog or build up with trash or soil.

A further object of this invention is to provide a mini tillage farm implement which, by reducing the required number of trips over a field, prepares a seed bed with the correct amount of soil moisture necessary for optimal germination and growth.

Another object of this invention is to provide a minimum tillage farm implement which is powered by the power takeoff of the tractor pulling the implement.

A further object of this invention is to provide a minimum tillage farm implement which can be readily transported and readily turned around in fields.

Another object of this invention is to provide a minimum tillage farm implement which is adjustable for providing variable width seed bed preparation and variable width cultivator coverage.

A further object of this invention is to provide a minimum tillage farm implement which prepares a seed bed and plants seeds in between last year's rows and does not disturb last year's stalks or stubble and encourages weed growth outside of the newly formed seed beds, thus further reducing soil erosion.

A further object of this invention is to provide a minimum tillage farm implement which is durable, easy to service and maintain, easy to adjust, and is economical.

Additional objects, features, and advantages of the invention will become apparent with reference to the accompanying specification and drawings.

SUMMARY OF THE INVENTION

This invention utilizes a tool bar frame upon which is mounted a plurality of sets of ground working implements which till and plant row crops in one pass of the field. The implement is attached to a conventional three-point hitch of an agricultural tractor and utilizes conventional planting unit to plant the seeds.

The ground working tools of each set are arranged serially one behind another along the direction of travel of the implement, each set comprising a coulter means, a plowing means a discing means, a rototilling means, and a planter unit, in that order. The coulter means, plowing means, and discing means are attached to the front tool bar; each set being spaced apart along the front tool bar to define the location of the rows of the crops to be planted. The rototilling means are attached to the second tool bar while the planting units are attached to the third bar both in line with the tools on the front tool bar.

The coulter means splits and slices the untilled ground directly in front of the plowing means which further loosens the ground and shatters hardpan that may exist, to enhance root growth of the seeds which are to be planted along that line. Discing means, directly behind the plowing means, are angled so that the channel plowed by the plowing means is covered up and somewhat levelled. The rototilling means then passes and efficiently and effectively processes the soil so that an even, uniform porous seed bed is formed. The conventional planter unit then forms a furrow, deposits the seeds, and covers up the seeds.

The specialized structure of the tool bar frame allows the front and rear tool bars to be detached from the middle tool bar, leaving the middle tool bar with the rototillers to be used as power cultivators once the planted crops have grown to a sufficient level. The width of coverage of the rototiller is adjustably variable by adding or removing tines of each unit.

BRIEF DESCRIPTION OF THE DRAWINGS

FIG. 1 is a side elevational view of the invention in it planting mode showing the relative depths to which the ground working tools function in the ground and is taken along lines 1—1 of FIG. 2.

FIG. 2 is a partial plan view of the invention in the planting mode.

DETAILED DESCRIPTION OF THE PREFERRED EMBODIMENT

Figure 5:
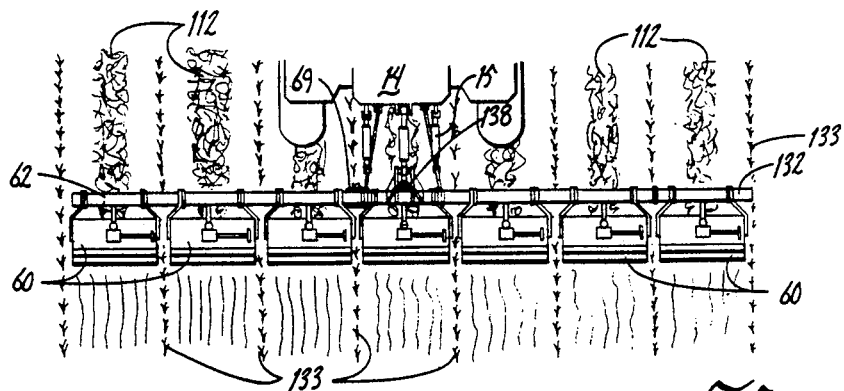
FIG. 5 is a top view of a six row embodiment of the invention in its cultivator mode.

In reference to the drawings, and particularly FIG. 1, there is shown a minimum tillage farm implement 10 in accordance with the invention. A tool bar frame 12 provides the basic support for the various ground working tools which make up the implement. Tool bar frame 12 can be made up of square 2 inch by 2 inch or 3 inch by 3 inch tool bars. The tool bar steel stock can vary in size in accordance with the load put on individual frame members. The implement 10 is attached to three-point hitch 15 (shown in FIGS. 1, 4 and 5), pulled by tractor 14 and utilizes power take-off (PTO) 16 and hydraulic lines (not shown) of tractor 14 for various operational functions.

FIG. 1 shows the structural relationship of the various ground working tools and their positions in the soil while in use. The same combination of elements exists for each row of crop to be planted, and in the preferred embodiment a six row implement is disclosed.

The first ground working tool is a rolling coulter 20 which is attached to front tool bar 22 of tool bar frame 12 by mounting means 24. The coulter itself is hingably attached to mounting means 24 but is dampened by spring 26 which is attached at opposite ends to mounting means 24 and coulter 20 respective Coulter 20 comprises a round, flat metal disc 28 which is rotatably secured to supports 30 which in turn are hingably connected to mounting means 24. Coulter 20 splits and slices the untilled ground it encounters and most importantly cuts and slices any crop trash that exists from last year's crops which significantly deters any clogging of the chisel plow by the trash.

Rolling coulter 20 is positioned so that upon striking obstacles in the ground and hingeably moving upward it does not come in contact with front tool bar 22.

Disc 28 is generally adjusted to cut through the soil at a depth of approximately 3", the disc being approximately 22" in diameter so that it can effectively cut through even large, heavy trash. Spring 26 biases disc 28 into the ground yet allows it to be resilient to obstacles such as rocks in the soil.

Located directly behind coulter 20 is chisel plow 32 which is attached to front tool bar 22 by mounting means 34. In the preferred embodiment, chisel plow 32 is made of spring steel. It thus will be resilient to the drag and friction it encounters in the ground. Additionally, spring 36, attached at opposite ends to chisel plow 32 and extension arm 37, urges plow 32 forward so that a jerking-type motion is produced by plow 32 as it moves through the soil. There is adequate clearance (generally 5 to 7 inches) between coulters 20 and chisel plows 32 to prevent clogging of soil or trash. Chisel plow 32 is swept back, extending approximately 6-9" into the ground, and falls directly in the path cut by disc 28. The spring steel construction provides chisel plow 32 with resiliency against rocks and other obstacles. Chisel plow 32 is swept back so that the hard compacted soil is effectively broken up but not kicked up, so that the moisture in the soil is retained.

Chisel plow 32 can also have replaceable wear plates at its lower end to facilitate economical replacement of those plates when they become worn.

The small furrow produced by chisel plow 32 is covered and levelled by discs 38 and 40. Discs 38 and 40 are rotatably mounted on axles 42 which are attached to lower arms 44. Lower arms 44 are adjustably connected at elbow members 46 to upper arms 48 which are adjustably attached to mounting means 50 which are attached to front tool bar 22. The fore and aft adjustability of discs 38 and 40 by elbow members 46 can be accomplished by the structure of elbow members 46 shown in FIG. 2. The lower ends 52 of upper arms 48 can be of hemispherical shape, as can the upper ends 54 of lower arms 44. These hemispherical ends 52 and 54 have tooth-like serrations along their edges so that when mated and secured by bolt 56 and nut 58, the mated serrations secure the hemispheres 52 and 54 at that attitude, which hold lower arms 44 and discs 38 and 40 in the desired positions relative to chisel plow 32.

Alternatively, adjustable elbows could be located at ax 42 of discs 38 and 40 so that one-piece arms extend from tool bar 22 to axles 42. Other adjustment variations can also be used.

Discs 38 and 40 are generally positioned so that they engage the ground to a depth of 2". They are also oriented so that they push the soil which has been disturbed by chisel plow 32 back over that narrow furrow and also generally level the ground for proper herbicide incorporation by the rototiller. As can be seen in FIG. 2, the front edges of disc 38 and 40 are spread apart wider than the rear edges for this purpose. Discs 38 and 40 are approximately 22 inches in diameter in the preferred embodiment.

Both rolling coulters 20 and discs 38 and 40 can have conventional disc scrapers (not shown) to clean and help promote cleaner cutter action of these implements.

Figure 4:
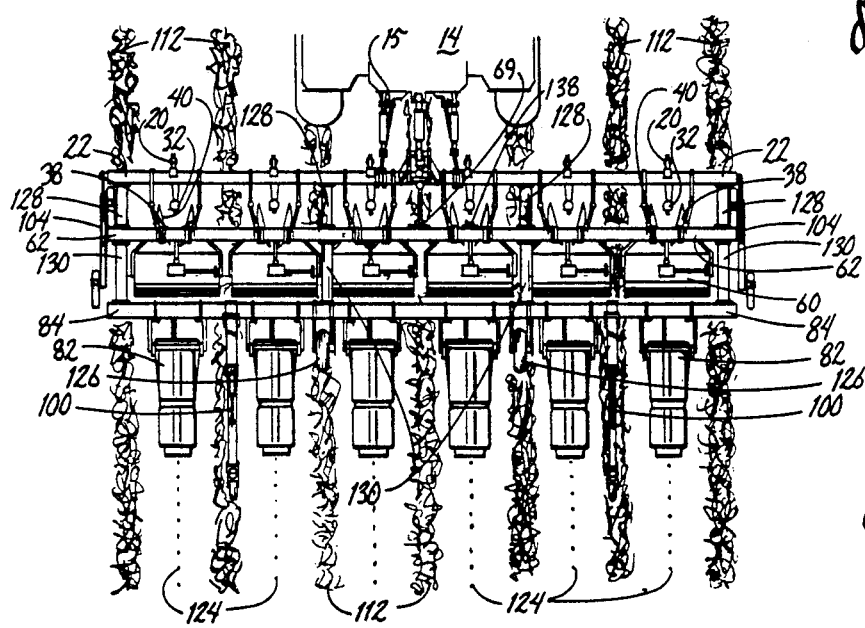
FIG. 4 is a top view of a six row embodiment of the invention in its planting mode.
Figure 3:
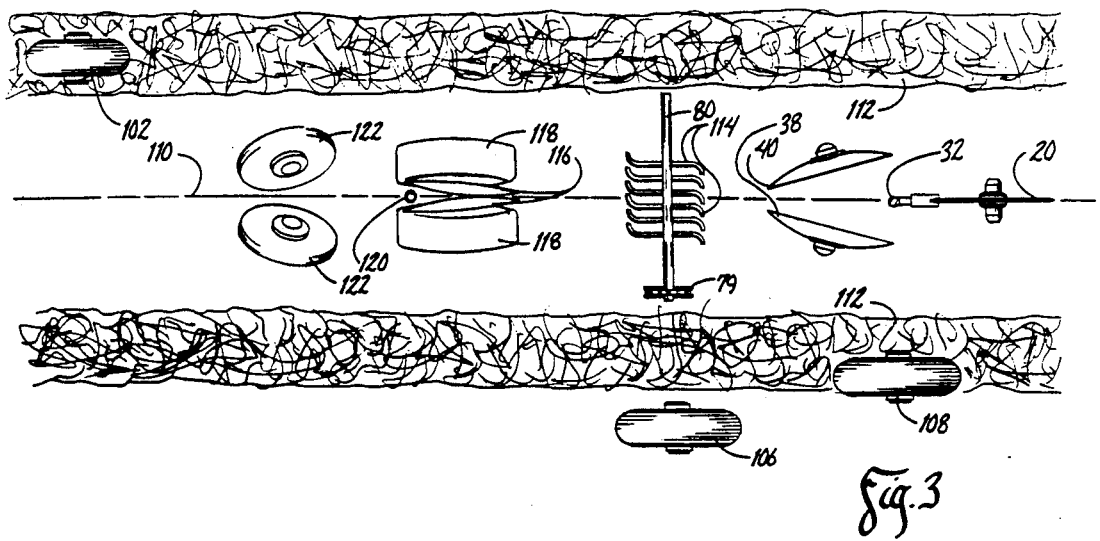
FIG. 3 is a top view showing only the ground contacting parts of the invention in its planting mode except for the planter drive wheels.

Following discs 38 and 40 are rototillers 60 which are attached to middle tool bar 62. Referring again to FIG. 1, it can be seen that the attachment to middle tool bar 62 is accomplished by means of upper parallel arms 64 and lower parallel arms 66 on both sides of each rototiller 60. The forwardmost ends of parallel arms 64 and 66 attach hingably to mounting means 68 which in turn is attached to middle tool bar 62. The rearwardmost ends of lower parallel arms 66 are attached to the supporting structure of opposite ends of the axle 80 of rototiller 60 to provide maximum support, while the rearwardmost ends of upper parallel arms 64 are attached to opposite sides of housing 70 of rototiller 60. The parallel upper and lower arms are hingably attached at both ends to allow the rototiller to "float" while at the same time, the weight of the rototiller 60 provides adequate downward force for rototillers 60 to engage the soil to a sufficient depth. Spring loaded assists or weight can be added to meet varying soil conditions. In the preferred embodiment, the length of the tines from tip to tip of the rototiller is approximately 23". Rototillers 60 are powered from the PTO 16 of the tractor which is linked to the rototillers by means of shafts, gear boxes and universal joints. In the preferred embodiment of the invention, PTO 16 extends directly rearward from tractor 14, past front tool bar 22 to a position just below middle tool bar 62, as can be seen in FIGS. 1 and 4. A gearbox 69 is located at that position and converts the lateral rotational forces by turning lateral shaft 71 which is rotatably mounted along the underside of middle tool bar 62. A conventional friction torque limiter (not shown) is added to PTO 16 just ahead of gearbox 69. Individual gearboxes (not shown) are thus mounted directly in front of each rototiller 60 and join rotatable connecting shafts 72 to gearboxes 76 located on housing 70 of rototillers 60. Shafts 74 then again convert the rotational power originating in PTO 16 laterally to chain drive 78. Chain drive 78 turns sprocket 79 of axle 80, as seen in FIG. 3.

Because rototillers 60 are powered from PTO 16 of tractor 14, they can be rotated at various speeds by varying the speed of the tractor engine or by changing gears in gearbox 69 which is advantageous for different treatments of the soil and for different types of soil and different types of soil conditions.

Planter units 82 are connected to rear tool bar 84 by mounting means 86. Like rototillers 60, parallel attachment arms 88 and 90 connect planter units 82 to mounting means 84. Additionally, a down pressure spring attachment 92 is placed between arms 88 and mounting means 84 to aid soil penetration if needed.

Planter unit 82 is of conventional structure having furrow opening means, seed delivery means and furrow closing means. Fertilizer and insecticide can be applied by planter unit 82 as part of the planting action. This fertilizer and insecticide is stored in bin 95 whereas the seeds are stored in bin 94. It can be seen in FIG. 2 that planter units 82 are driven by chain 96 which is connected to drive shaft 98. Lift assist assemblies 100 which include 360° rotatable wheels 102 are also attached to rear tool bar 84 at two centered locations. During transport, lift assist assembly 100 rises to a height whereby none of the ground working tools engages the ground. Tandem lift assist assembly 104 attaches to opposite sides of tool bar frame 12 and utilizes 360° rotatable wheels 106 and 108 and floating axle construction to further support the implement during turning and transport.

FIG. 3 shows how the ground contacting parts of the invention in the planting mode work the soil and plants the seeds along a seed line 110 which is approximately centered in the between-rows area of last year's crop. Numeral 112 designates the depiction of last year's stalks and stubble. As can be seen, coulter 20 is directly followed by chisel plow 32 along seed line 110. Discs 38 and 40, in their angular orientation, then follow chisel plow 32. Tines 114, attached to axle 80 of rototiller 60, cover the area approximately 10-12 inches wide and surrounding seed line 110. Planter unit 82 has furrow opening discs 116 and compacting wheels 118 which open a planting furrow in the fine rototilled soil and compact the walls of the furrow in preparation for seed tube 120 to deposit seeds in the furrow. Finally, closing wheels 122 cover up the seeds with loose soil.

Implement 10 is adjustable so that it may be used in at least two modes. Mode 1 is depicted in FIG. 4 whereby the total structure described above is utilized in presenting a six row minimum tillage planter. The components are arranged so that the six sets of ground working tools are attached to tool bar frame 112. Stalks and stubble 112 is completely untouched by implement 10 in this mode whereas the ground inbetween is tilled by coulters 20, chisels 32, discs 38 and 40, and rototillers 60. Planter units 82 then follow, depositing seeds 124 along seedline 110. FIG. 4 also shows planter drive wheels 126 which are connected by chains to drive shaft 98 as seen in FIG. 2.

FIG. 5 shows the second mode of operation of implement 10. Front and rear tool bars 22 and 84 are removed by detaching front interconnecting frame members 128 and rear interconnecting frame members 130 from middle tool bar 62. An extender tool bar 132 is then added to one end of middle tool bar 62 and with it an additional rototiller 60. Tractor 14 is then attached to middle tool bar 62 in a manner in which the seven rototillers are positioned between the now planted rows 133 of crops so that they may cultivate the trash and any weeds that have grown inbetween new rows 133. To facilitate the shift of the rototillers a half a row over in the cultivator mode, a second gearbox 138 is positioned along lateral shaft 71 so that upon hitching of tractor 14 to middle tool bar 62 in cultivator mode 2, PTO 16 can extend straight back allowing the seven rototillers 60 to be balanced. This allows PTO shaft 16 to remain straight from tractor 14 to the tool bar frame 12 regardless what mode the implement 10 is in. The width of coverage of rototillers 60 can be determined by adding or subtracting tines 114 to axle 80. Generally, a lesser number of tines 14 will be used when in the planting mode and a greater number will be used to get maximum cultivation coverage in mode 2. Additionally, conventional stabilizing coulters (not shown) can be added to the middle tool bar 62 to stabilize the cultivator's direction of travel in the second mode.

In operation, the planting mode functions as follows. With particular reference to FIG. 3, it can be seen that after implement 10 has been transported and lowered by three point hitch 15 and lift assist assemblies 100 and 104 to its operative position in the soil, coulters 20 slice and cut through any trash along the seed lines. Chisel plows 32 then cut and plow out narrow channels approximately 6-9" deep along seed lines 110. Disc pairs 38 and 40 subsequently cover and level the ground to either side of seed lines 110. Rototillers 60, rotating at comparatively high revolutions per minute, break up and finely till the soil to produce an even, level seedbed of fine, porous soil which is capable of better moisture absorption than other methods. Planter units 82 then follow and work as described above. At the end of each row, lift assist assemblies 100 and 104 are actuated, implement 10 is lifted from its operative position, and tractor 14 and implement 10 are turned around and repositioned for another pass through the field. FIG. 4 depicts implement 10 in the planting mode as it would appear in operation. Implement 10 thus combines the processes of tillage and planting into one pass, producing the cost saving benefits which have been described above.

Additionally, the preferred embodiment of the invention has the added advantage of efficiently and effectively incorporating herbicide into the soil in bands in and around the seedbeds prepared by rototillers 60. This is accomplished by connecting a liquid herbicide supply via supply lines 134 to nozzles 136 inside of each housing 70 of rototillers 60. Herbicide supply tanks can be mounted on tractor on implement or on trailing containers hitched to the implement. By utilizing such structure, the herbicide is shielded from wind, is sprayed only in the narrow paths which become the seedbeds, and is thoroughly and optimally incorporated into the soil by the rototiller 60. Additional shields (not shown) can be added to each end of tines 114 to provide uniform herbicide incorporation and to better provide for a level seed bed. It has been found that incorporation by rototillers is the most effective and most efficient manner of applying herbicides because the thorough mixing of the soil and the precise, most beneficial depth of incorporation can be controlled.

Likewise, insecticide and fertilizer can be applied either through conventional planter units 82 or by other means which can be placed upon implement 10. Anhydrous ammonia or liquid nitrogen can be applied by mounting hoses directly behind chisel plows 32. Supply tanks can be carried on tractor 14, on implement 10, or on trailing containers hitched to the implement.

Pumps to convey herbicides or fertilizer can be powered by the tractor's hydraulic system or by rotational power from the tractor's power take-off, as supplied to gearbox 69.

The second mode of implement 10, the cultivator mode, becomes operational by removing front and rear tool bars 22 and 84 and hitching tractor 14 to remaining middle tool bar 62. Additional tines 114 are added to axles 80 of rototillers 60 to widen the coverage of rototillers 60. Weeds are not a problem in the actual crop rows because of the effective incorporation of herbicide when planting. In fact, weeds are encouraged to grow in between the rows during early stages of growth to deter wind and water erosion. At a suitable time after the crops have grown, a pass is made with cultivator mode 2 of implement 10 with the rototiller 62 operating at a comparitively lower revolutions per minute so that the weed growth in between the rows is simply cut off approximately just below ground level and the trash in the rows is mulched. This leaves additional ground cover, again deterring erosion, while at the same time cutting down the weeds.

Thus, with two passes, the crops have been effectively planted and effectively cultivated. An additional cultivation may be desirable, otherwise no other field work is needed until harvest.

It is to be noted that mounting means 24, 34, 50, 68, and 86 can be any suitable securing hardware adaptable to secure the ground working tools to tool bars 22, 62, or 84. Securing hardware to accomplish this purpose is known in the art.

Conventional marker devices can also be hingeably mounted to opposite sides of tool bar frame 12 and have hydraulically-powered variable speed discs at their extreme ends. These markers can be dropped and pulled through non-planted ground to provide a marker line for the operator to gauge straight rows with on the return pass of implement 10. The variable speed discs allow the operator to choose what rotational speed leaves the most visible mark in different trash, light and soil conditions. The discs would have angled edges to aid penetration in hard soils or heavy trash.

Figure 6:
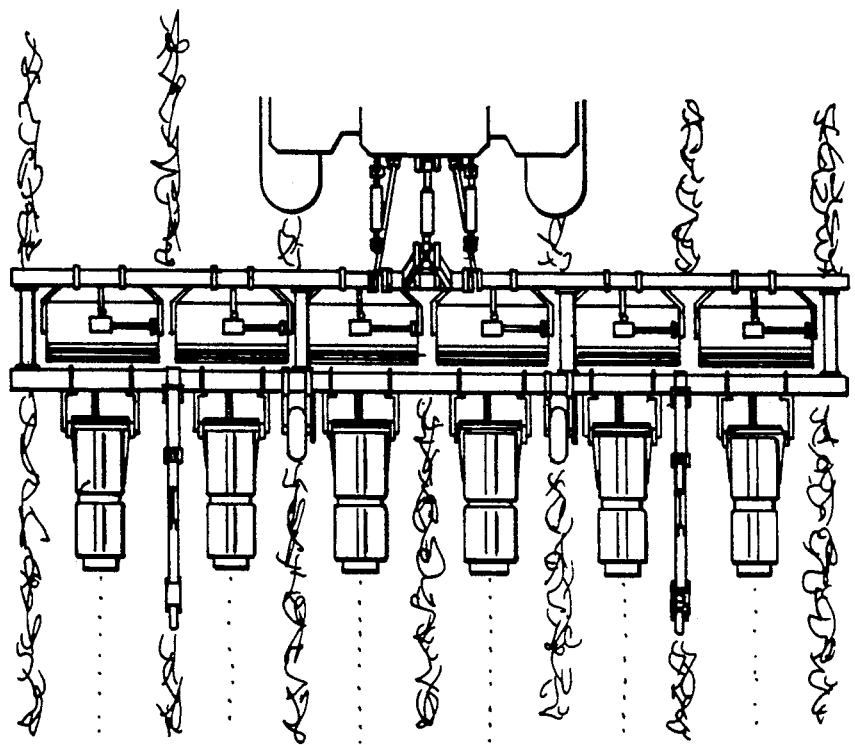
FIG. 6 is a top view of a two tool bar embodiment of the invention in its planting mode.
Figure 7:
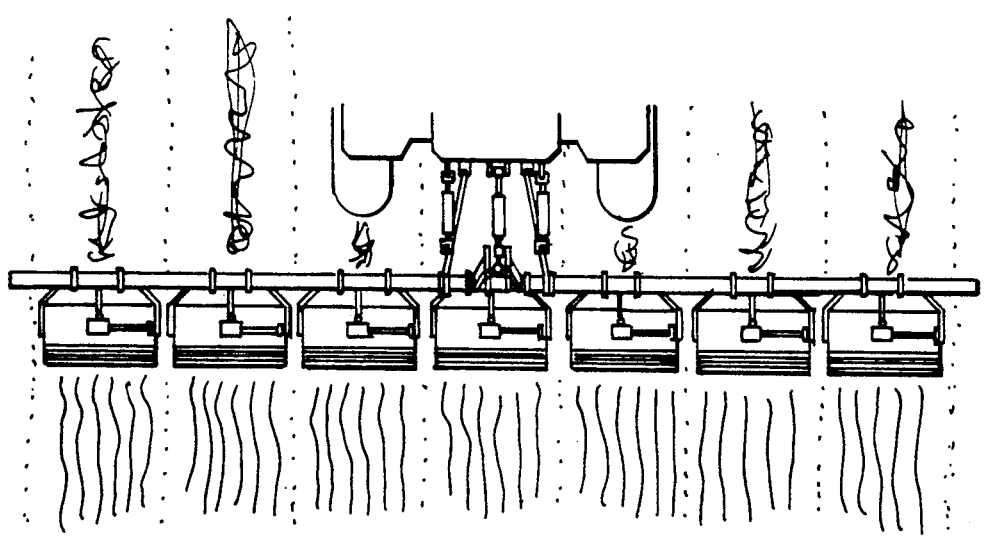
FIG. 7 is a top view of an alternative embodiment of the invention in its cultivator mode.

FIGS. 6 and 7 depict an alternative embodiment of the present invention showing top vies similar to those of FIGS. 4 and 5. The only difference of this embodiment is that the invention utilizes only the middle and rear tool bars in the planting mode, and like FIG. 5 results in the use of one tool bar in the cultivation mode. The rototillers must be positioned in-between the planted row crops during cultivation.

Thus it can be seen the invention accomplishes at least all of its stated objectives. It is to be noted that modifications and alterations can be made while staying within the boundaries of the invention.

What is claimed is:

1. A method of minimum strip tillage utilizing farm implement for pulling by a tractor means and adapted for single pass seed bed preparation and planting of crop rows, as well as for operative connection or means for selective insecticide, herbicide and fertilizer application when in first mode, and having a second mode for use as a power cultivator in-between said crop rows, said implement comprising:

forming a tool bar frame comprised of detachable removable, interconnecting frame members and spaced apart front, and rear tool bars for attachment of a plurality of sets of ground working implements, said tool bars being detachably adjoined by said interconnecting frame members;

in said first mode connecting said tractor means by tractor connection means to a first position on said front tool bar and each said set of ground working implements being aligned in series along said front and rear tool bars for preparation of one crop row as follows, said front tool bar carrying individually powered, individually floating rototillers to prepare a strip tillage seed bed, and said rear tool bar carrying detachable planters; and removing said rear tool bar by detaching said detachable interconnecting members at least from said front tool bar to leave only said front tool bar and power rototillers for use in a second mode, connecting said tractor means by said tractor connection means to a second position on said front tool bar offset from said first position on said front tool bar in a manner to allow operation of said implement is said second mode as in-between-row power cultivators.

2. A method of minimum strip tillage for first mode single pass defined-width narrow strip seedbed preparation and planting a crop rows in the defined-width narrow strip seedbeds and for selective second mode, second pass cultivation in-between emerged plants in the crop rows, comprising the steps of:

receiving and securing a hitching means of a tractor means to a first hitching location on a convertible implement means assembled in a first mode wherein ground working tools are aligned in series for preparation of rows of defined-width narrow strip seedbeds and planting of crop rows in the defined-width narrow strip seedbeds;

preparing each defined-width narrow strip seedbed in unworked soil containing existing trash, taken from the set comprising trash in between previous crop rows and trash from previous field uses, and planting a crop row in each defined-width narrow strip seedbed in a single pass by carrying on the first mode implement as ground working tools at least a plurality of powered rototiller means each adapted for preparing the defined-width narrow strip seedbed, followed by a planting means for planting each crop row only in the defined-width narrow strip seedbed so that only the defined-width narrow strips of the seedbeds are worked into finely cultivated narrow seedbeds, the existing trash is ground-up in or eliminated from the narrow seedbeds, and the areas outside the narrow strip seedbeds are untouched for minimization of soil loss, inhibition of weed growth, and other minimum strip tillage purposes, the narrow strip seedbeds being narrower in width than the distance between each crop row;

converting the implement means to a second mode after emergence and partial maturing of plants from each crop row by movably adjusting each rototiller means in relation to one another and the tractor by utilizing means for adjusting the position of all the rototiller means on the implement and widening the ground-working width of each rototiller so that the rototillers are spaced apart and adapted for aligned, in-between-row power cultivation which does not impinge upon the plants in each crop row but which does power rototill substantially across the distance between crop rows; and maintaining the hitching means of the tractor means to the first hitching location on the convertible implement means and cultivating around the crop rows in the second mode, second pass, by separating the planting means from the rototiller means and directing the rototiller means on opposite sides of the crop rows so that existing trash and any emerged weeds in between the emerged crop rows are power cultivated to assist in weed control and for other minimum strip tillage purposes.

3. The implement of claim 2 further comprising means connected to the first toolbar to incorporate herbicide into the seed bed when using the implement in the first mode.

4. The implement of claim 2 further comprising means attached to the first toolbar to incorporate fertilizer into the seed bed during the use of the implement in the first mode.

5. A method of minimum strip tillage for first mode single pass row crop defined-width narrow strip seedbed preparation and planting of row crops in the defined-width narrow strip seedbeds, and the convertible second mode in-between-row cultivation of emerged plants in the row crops, comprising the steps of:

receiving and securing a hitching means of a tractor means to a first hitching location on a convertible implement means assembled in the first mode wherein ground working tools are aligned in series for preparation of rows of defined-width narrow strip seedbeds and planting of crop rows in the defined-width narrow strip seedbeds;

preparing each defined-width narrow strip seedbed in unworked soil containing existing trash, taken from the set comprising trash in between previous crop rows and trash from previous field uses, and planting a crop row in each defined-width narrow strip seedbed in a single pass by carrying on the first mode implement as ground working tools at least a plurality of powered rototiller means each adapted for preparing the defined-width narrow strip seedbed, followed by a planting means for planting each crop row only in the defined-width narrow strip seedbed so that only the defined-width narrow strips of the seedbeds are worked into finely cultivated narrow seedbeds, the existing trash is ground-up in or eliminated from the narrow seedbeds, and the areas outside the narrow strip seedbeds are untouched for minimization of soil loss, inhibition of weed growth, and other minimum strip tillage purposes, the narrow strip seedbeds being narrower in width than the distance between each crop row;

converting the implement means to a second mode after emergence and partial maturing of plants from each crop row by movably adjusting the hitching means of the tractor means to a second hitching location on the convertible implement means in a second mode, the second hitching location being generally one-half the distance between adjacent crop rows removed from the first hitching location spaced apart and aligned so that the rototiller means on the implement are configured for in-between row power cultivation which does not impinge upon the plants in each crop row but which does power rototill substantially across the distance between crop rows; and cultivating around the crop rows in the second mode, in a second pass by separating the planting means from the rototiller means, widening the ground working width of each rototiller means from the defined-width of the narrow seedbeds, and directing the rototiller means on opposite sides of the crop rows so that existing trash and any emerged weeds in between the emerged crop rows are power cultivated to assist in weed control and for other minimum strip tillage purposes.

6. The implement of claim 5 further comprising means connected to the first toolbar to incorporate herbicide into the seed bed when using the implement in the first mode.

7. The implement of claim 5 further comprising means attached to the first toolbar to incorporate fertilizer into the seed bed during the use of the implement in the first mode.

8. A minimum strip tillage farm implement for pulling by a tractor and adapted for single pass crop row seedbed preparation and planting a crop rows in a first mode and in-between-row power cultivation in a second mode, said implement comprising:

a convertible tool bar frame comprised of, in the first mode, detachable, removable, interconnecting frame members and spaced-apart first and second tool bars for attachment of a plurality of sets of ground working tools, each set aligned and separated a distance corresponding to each crop row, said tool bars being detachably adjoined by said interconnecting frame members;

hitching means connectable between the tractor and the implement for operatively connecting the tractor to the first tool bar at a hitching location, said first tool bar carrying as ground working tools at least powered, individually floating rototillers, each rototiller including width adjustment means adjusted to prepare a strip tillage seedbed of a defined width in the first mode, and said second tool bar carrying as ground working tools at least detachable planters to plant seeds in each strip tillage seedbed in the first mode; and position adjustment means associated with the power rototillers for allowing movable adjustment of the power rototillers along said first tool bar to convert the tool bar frame to the second mode so that when in said second mode, said tractor is hitched with the hitching means to the first tool bar at said hitching location and the position adjustment means of said rototillers are adjusted to move the rototillers approximately one-half the width between adjacent crop rows on the first tool bar and the width adjustment means of the rototillers are adjusted to widen each rototiller from the defined width of the seedbed to a width substantially spanning the distance between adjacent crop rows to be used as in-between-row power cultivators to till the remaining ground between crop rows, the tool bar frame and rototillers being positioned relative to the ground and each other to cultivate growing crops without interference with the crops.

9. The implement of claim 8 including an additional rototiller added to the first toolbar of the implement when the position adjustment means of the rototillers are adjusted to prepare for use as in-between-row power cultivators.

10. The implement of claim 8 further comprising means connected to the first toolbar to incorporate herbicide into the seed bed when using the implement in the first mode.

11. The implement of claim 8 further comprising means attached to the first toolbar to incorporate fertilizer into the seed bed during the use of the implement in the first mode.

12. A minimum strip tillage farm implement for pulling by a tractor and adapted for single pass row crop seed bed preparation and planting of row crops and for convertible in-between-row cultivation of row crops, said implement comprising:

a tool bar frame comprised of at least first and second tool bars, and detachable, removable, interconnecting frame members rigidly securing the first and second tool bars in a first implement mode, and allowing removal of the second tool bar from the first tool bar in a second implement mode;

first ground working tools aligned along the first tool bar, separated a distance corresponding to each crop row;

second ground working tools spaced along the second tool ar separated a distance corresponding to the distance between crop rows, and aligned with corresponding first ground working tools on the first tool bar;

first and second hitching locations on the first tool bar, the first hitching location and the second hitching location being offset by approximately one-half the width between adjacent crop rows;

hitching means connectable between the tractor and the implement at either the first or second hitching locations;

attachment/detachment means on the interconnecting frame members for selectively attachment or removal of the frame members from the first and second tool bars; and the hitching means being connected to the first hitching location when the first mode operation of the implement is desired whereby the first and second tool bars are adjoined by the interconnecting frame members; and the hitching means being connected to the second hitching location when the second mode operation is desired, whereby the second tool bar is removed and detached from the first tool bar.

13. The implement of claim 12 wherein the first ground working tools of the first tool bar include individually floating rototillers each having width adjustment means for adjusting the ground working width of each rototiller.

14. The implement of claim 13 wherein each rototiller has a plurality of tines and the width adjustment means to adjust the width of the rototillers includes means for varying the number of tines of the rototiller from a number sufficient to prepare the narrow seed bed in the first mode, to a greater number to form a wider ground working width for cultivation in the second mode.

15. A minimum strip tillage farm implement for pulling by a tractor and adapted for single-pass, row-crop seed bed preparation and planting of row crops, and for convertible in-between-row cultivation of row crops, said implement comprising:

a tool bar frame comprised of at least first and second tool bars, and detachable, removable, interconnecting frame members rigidly securing the first and second tool bars in a first implement mode, and allowing removal of the second tool bar from the first tool bar in a second implement mode;

first ground working tools aligned along the first tool bar, separated a distance corresponding to each crop row;

second ground working tools spaced along the second tool ar separated a distance corresponding to the distance between crop rows, and aligned with corresponding first ground working tools on the first tool bar;

hitching means connectable between the tractor and the implement at a hitching location on the first tool bar;

attachment/detachment means on the interconnecting frame members for selectively attachment or removal of the frame members from the first and second tool bars;

adjustment means on the first tool bar for adjusting the first ground working tools between first and second positions, the second position being offset by approximately one-half the width between adjacent crop rows; and first ground working tools being secured in the first position on the first tool bar when the first mode operation of the implement is desired whereby the first and second tool bars are adjoined by the interconnecting frame members; and the first ground working tools are secured in the second position on the first tool bar when the second mode operation is desired, whereby the second tool bar is removed and detached from the first tool bar.

16. The implement of claim 15 further comprising means connected to the first toolbar to incorporate herbicide into the seed bed when using the implement in the first mode.

17. The implement of claim 15 further comprising means attached to the first toolbar to incorporate fertilizer into the seed bed during the use of the implement in the first mode.

18. A minimum strip tillage farm implement for pulling by a tractor means and adapted for single pass seed bed preparation and planting of crop rows, as well as for operative connection for means for selective insecticide, herbicide and fertilizer application when in a first mode, and having a second mode for use as a power cultivator in-between said crop rows, said implement comprising:

a tool bar frame comprised of detachable removable, interconnecting frame members and spaced apart front and rear tool bars for attachment of a plurality of sets of ground working implements, said tool bars being detachably adjoined by said interconnecting frame members;

in said first mode said tractor means being operatively connected by tractor connection means to a first position on said front tool bar and each said set of ground working implements being aligned in series along said front and rear tool bars for preparation of one crop row as follows, said front tool bar carrying individually powered, individually floating rototillers to prepare a strip tillage seed bed, and said rear tool bar carrying detachable planters; and wherein said rear tool bar is removable by detaching said detachable interconnecting members at least from said rear tool ar to leave only said front tool bar and power rototillers for use in a second mode, said tractor means being operatively connectable by said tractor connection means to a second position on said front tool bar offset from said first position on said front tool bar in a manner to allow operation of said implement is said second mode as in-between-row power cultivators.

* * * * *

UNITED STATES PATENT AND TRADEMARK OFFICE
CERTIFICATE OF CORRECTION

PATENT NO. : 5,303,662
DATED : April 19, 1994
INVENTOR(S) : Denny W. Drake

It is certified that error appears in the above—identified patent and that said Letters Patent is hereby corrected as shown below:

In claim 12, column 12, line 26, please delete [ar] and substitute --bar--.

In claim 12, column 12, line 38, please delete [selectively] and substitute --selective--.

In claim 15, column 13, line 8, please delete [ar] and substitute --bar--.

In claim 18, column 14, line 30, please delete [ar] and substitute --bar--.

Signed and Sealed this

Thirtieth Day of August, 1994

Attest:

BRUCE LEHMAN

Attesting Officer    Commissioner of Patents and Trademarks